US011485484B2

United States Patent
Wiinikka et al.

(10) Patent No.: US 11,485,484 B2
(45) Date of Patent: Nov. 1, 2022

(54) REMOVABLE STRUTS FOR VIBRATION ISOLATION DEVICE MOUNTING SYSTEM

(71) Applicant: Bell Textron Inc., Fort Worth, TX (US)

(72) Inventors: Mark Wiinikka, Hurst, TX (US); Scott Hemmen, Hurst, TX (US); Nathan P. Green, Mansfield, TX (US); James Blake, Fort Worth, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 120 days.

(21) Appl. No.: 17/186,484

(22) Filed: Feb. 26, 2021

(65) Prior Publication Data

US 2021/0179262 A1 Jun. 17, 2021

Related U.S. Application Data

(63) Continuation of application No. 16/019,826, filed on Jun. 27, 2018, now Pat. No. 10,967,962.

(51) Int. Cl.
*B64C 27/00* (2006.01)
*B64D 27/26* (2006.01)
(Continued)

(52) U.S. Cl.
CPC ............ *B64C 27/001* (2013.01); *B64D 27/26* (2013.01); *F16F 13/24* (2013.01);
(Continued)

(58) Field of Classification Search
CPC .. B64D 27/26; B64D 2027/264; B64D 41/00; B64C 27/12; B64C 27/001;
(Continued)

(56) References Cited

U.S. PATENT DOCUMENTS 5,788,372 A * 8/1998 Jones .................... F16F 9/5126
267/293
6,715,746 B2 * 4/2004 Bachmeyer ............ F16F 7/003
267/116

(Continued)

FOREIGN PATENT DOCUMENTS

EP 2610172 A1 7/2013
EP 2615027 A1 7/2013
(Continued)

OTHER PUBLICATIONS

European Patent Office, European Search Report for EP Appl. No. 18188732.4 dated Feb. 20, 2019, 5 pp.
(Continued)

*Primary Examiner* — Justin M Benedik
(74) *Attorney, Agent, or Firm* — Edwin S. Flores; Daniel J. Chalker; Chalker Flores, LLP

(57) ABSTRACT

A strut assembly for a vibration isolation device is disclosed, comprising a piston spindle; a first elastomeric member and a second elastomeric member bonded to the piston spindle and in contact with an upper housing and a lower housing, respectively; a first strut support and a second strut support attached to or integral with the upper housing and the lower housing, respectively; a first strut spindle and the second strut support configured to be placed in the first strut support and the second strut support, respectively; and one or more removable struts configured to be engaged to the first strut spindle and to the second strut spindle, wherein at least one of the first or second strut spindles is removable such that the one or more struts can be replaced without breaking a bonding of the first elastomeric member, the second elastomeric member, or both.

20 Claims, 9 Drawing Sheets

(51) Int. Cl.
*F16F 13/24* (2006.01)
*F16F 13/08* (2006.01)
*F16F 13/10* (2006.01)

(52) U.S. Cl.
CPC .. *B64C 2027/002* (2013.01); *B64D 2027/262* (2013.01); *F16F 13/085* (2013.01); *F16F 13/103* (2013.01)

(58) Field of Classification Search
CPC ...... B64C 2027/002; F01D 25/28; F02C 7/20; F05D 2240/90; Y02T 50/44; Y02T 50/671; F16F 1/3713
See application file for complete search history.

(56) References Cited

U.S. PATENT DOCUMENTS

| | | | | |
|---|---|---|---|---|
| 8,672,262 B2 * | 3/2014 | Griffin | ................... | F16F 13/08 244/17.11 |
| 9,279,741 B2 | 3/2016 | Bennett et al. | | |
| 9,777,788 B2 * | 10/2017 | Lee | ........................ | F16F 7/00 |
| 10,703,465 B2 * | 7/2020 | Smith | ..................... | F16F 13/24 |
| 2013/0161884 A1 * | 6/2013 | Griffin | ................. | B64C 27/001 267/140.13 |
| 2018/0038439 A1 | 2/2018 | Lee et al. | | |
| 2020/0001986 A1 | 1/2020 | Wiinikka et al. | | |

FOREIGN PATENT DOCUMENTS

| | | |
|---|---|---|
| EP | 2615028 A2 | 7/2013 |
| EP | 3587257 A1 | 1/2020 |
| JP | 3545415 B2 | 9/1997 |
| WO | 20020270210 A1 | 4/2002 |

OTHER PUBLICATIONS

European Patent Office, Communication pursuant to Article 94(3) EPC for EP Appl. No. 18188732.4 dated Apr. 17, 2020, 4 pp.

* cited by examiner

REMOVABLE STRUTS FOR VIBRATION ISOLATION DEVICE MOUNTING SYSTEM

CROSS-REFERENCE TO RELATED APPLICATIONS

This application is a continuation patent application of and claims priority to U.S. patent application Ser. No. 16/019,826, filed on Jun. 27, 2018 entitled "Removable Struts for Vibration Isolation Device Mounting System". This patent application is related to U.S. provisional patent application Ser. No. 62/399,067 filed on Sep. 23, 2016 entitled "Improved Helicopter Transmission System" and U.S. provisional patent application Ser. No. 62/423,371 filed on Nov. 17, 2016 entitled "Improved Helicopter Transmission System," all of which are hereby incorporated by reference in their entirety.

STATEMENT OF FEDERALLY FUNDED RESEARCH

This application is not the subject of any federally sponsored research or development.

TECHNICAL FIELD OF THE INVENTION

The present invention relates in general to the field of vibration control, and more particularly, to a vibration isolation device mounting system.

BACKGROUND OF THE INVENTION

Without limiting the scope of the invention, its background is described in connection with vibration isolation devices for aircraft.

One example is taught in U.S. Pat. No. 8,672,262, issued to Griffin, entitled "Mechanically Optimized Liquid Inertia Vibration Eliminator and Aircraft Pylon System", which describes a vibration isolator including an upper housing and a lower housing; an upper reservoir housing defining a upper fluid chamber; a lower reservoir housing defining a lower fluid chamber; a piston spindle resiliently coupled to the upper housing with an upper elastomer member, the piston spindle being resiliently coupled to the lower housing with a lower elastomer member; an elongated portion having a tuning passage; and a tuning fluid disposed there within. The vibration isolator cancels vibratory forces at an isolation frequency. The vibration isolator is utilized in a pylon system for mounting a transmission in an aircraft. The vibration isolator is located between a pylon structure and a roof structure. The isolator includes a spherical bearing assembly that is located near a waterline location of a rotational axis of a drive shaft.

Another example is taught in U.S. Pat. No. 9,279,741, issued to Lee et al., entitled "Mechanically Optimized Liquid Inertia Vibration Eliminator and Aircraft Pylon System", which describes a vibration isolation device including an upper housing and a lower housing; an upper reservoir housing defining an upper fluid chamber; a lower reservoir housing defining a lower fluid chamber; a piston spindle resiliently coupled to the upper housing with an upper elastomer member, the piston spindle being resiliently coupled to the lower housing with a lower elastomer member; an elongated portion having a tuning passage; and a tuning fluid disposed there within. The vibration isolation device cancels vibratory forces at an isolation frequency. The vibration isolation device is utilized in a pylon system for mounting a transmission in an aircraft. The vibration isolation device is located between a pylon structure and a roof structure. The isolator includes a spherical bearing assembly that is located near a waterline location of a rotational axis of a drive shaft.

Another example is taught in U.S. Pat. No. 9,777,788, issued to Lee et al., entitled "Rotorcraft Vibration Suppression System in a Four Corner Pylon Mount Configuration", in which the vibration suppression system includes a vibration isolation device located in each corner in a four corner pylon mount structural assembly. The combination of four vibration isolation devices, two being forward of the transmission, and two being aft of the transmission, collectively are effective at isolating main rotor vertical shear, pitch moment, as well as roll moment induced vibrations. Each opposing pair of vibration isolation devices can efficiently react against the moment oscillations because the moment can be decomposed into two antagonistic vertical oscillations at each vibration isolation device. A pylon structure extends between a pair of vibration isolation devices thereby allowing the vibration isolation devices to be spaced away from a vibrating body to provide increased control.

Another example is taught in U.S. Patent Application Publication No. 2018/0038439 A1, by Lee, et al., entitled "Rotorcraft Vibration Suppression System in a Four Corner Pylon Mount Configuration," in which the vibration suppression system includes a vibration isolator located in each corner in a four corner pylon mount structural assembly. The combination of four vibration isolators, two being forward of the transmission, and two being aft of the transmission, collectively are effective at isolating main rotor vertical shear, pitch moment, as well as roll moment induced vibrations. Each opposing pair of vibration isolators can efficiently react against the moment oscillations because the moment can be decomposed into two antagonistic vertical oscillations at each vibration isolator. A pylon structure extends between a pair of vibration isolators thereby allowing the vibration isolators to be spaced away from a vibrating body to provide increased control.

SUMMARY OF THE INVENTION

In one embodiment, a strut assembly for a vibration isolation device includes a piston spindle; a first elastomeric member bonded to the piston spindle; a second elastomeric member bonded to the piston spindle; an upper housing in contact with the first elastomeric member; a lower housing in contact with the second elastomeric member; a first strut support attached to, or integral with, the upper housing; a second strut support attached to, or integral with, the lower housing; a first strut spindle configured to be placed in the first strut support; a second strut spindle configured to be placed in the second strut support; and one or more removable struts configured to be engaged at a first end to the first strut spindle and at a second end to the second strut spindle, without engagement of the first end to the first strut support or engagement of the second end to the second strut support, wherein at least one of the first or second strut spindles is removable such that the one or more struts can be replaced without breaking a bonding of the first elastomeric member, the second elastomeric member, or both. In one aspect, the first elastomeric member or the second elastomeric member comprises rubber, plastics, composites, or layered materials. In another aspect, the first elastomeric member is bonded to the piston spindle or the second elastomeric member is bonded to the piston spindle using an elastomer-to-substrate adhesive, and the first elastomeric member or the second elastomeric member is molded and adhered to the piston spindle during a vulcanization process or bonded using a post-vulcanization process. In another aspect, the one or more removable struts is configured to be threaded or slotted at a first end to the first strut spindle and configured to be threaded or slotted at a second end to the second strut spindle. In another aspect, the one or more removable struts further comprise one or more surfaces on at least a portion of the strut to be engaged by a wrench.

In another embodiment, method of replacing a strut of a vibration isolation device includes providing the vibration isolation device including a piston spindle; a first elastomeric member bonded to the piston spindle; a second elastomeric member bonded to the piston spindle; an upper housing in contact with the first elastomeric member; a lower housing in contact with the second elastomeric member; a first strut support attached to or integral with the upper housing; a second strut support attached to or integral with the lower housing; and one or more struts removably configured to be engaged at a first end to the first strut spindle and at a second end to the second strut spindle, without engagement of the first end to the first strut support or engagement of the second end to the second strut support; placing a first strut spindle in the first strut support; placing a second strut spindle in the second strut support; engaging a first end of at least one of the one or more struts to the first strut spindle; engaging a second end of the at least one of the one or more struts to the second strut spindle; and removing the at least one of the one or more struts and installing a replacement strut without breaking a bonding of the first elastomeric member, the second elastomeric member, or both. In one aspect, the first elastomeric member or the second elastomeric member comprises rubber, plastics, composites, or layered materials. In another aspect, the first elastomeric member is bonded to the piston spindle or the second elastomeric member is bonded to the piston spindle using an elastomer-to-substrate adhesive, and the first elastomeric member or the second elastomeric member is molded and adhered to the piston spindle during a vulcanization process or bonded using a post-vulcanization process. In another aspect, the strut is threaded or slotted at a first end to the first strut spindle and threaded or slotted at a second end to the second strut spindle. In another aspect, the one or more removable struts further comprise one or more surfaces on at least a portion of the strut to be engaged by a wrench.

In another embodiment, a method of removing a strut from a vibration isolation device includes providing the vibration isolation device including a piston spindle; a first elastomeric member bonded to the piston spindle; a second elastomeric member bonded to the piston spindle; an upper housing in contact with the first elastomeric member; a lower housing in contact with the second elastomeric member; a first strut support attached to or integral with the upper housing; a second strut support attached to or integral with the lower housing; a first strut spindle configured to be placed in the first strut support; a second strut spindle configured to be placed in the second strut support; and one or more removable struts engaged at a first end to the first strut spindle and engaged at a second end to the second strut spindle, without engagement of the first end to the first strut support or engagement of the second end to the second strut support; applying a load to displace either the first elastomeric member or the second elastomeric member without breaking a bond of the first elastomeric member, the second elastomeric member, or both with the piston spindle; disengaging the first end of the strut and the first strut spindle or disengaging the second end of the strut and the second strut spindle, without breaking a bonding of the first elastomeric member, the second elastomeric member, or both with the piston spindle; and extracting the strut from the vibration isolation device without breaking the bond of the first elastomeric member, the second elastomeric member, or both with the piston spindle. In one aspect, the first elastomeric member or the second elastomeric member comprises rubber, plastics, composites, or layered materials. In another aspect, the first elastomeric member is bonded to the piston spindle or the second elastomeric member is bonded to the piston spindle using an elastomer-to-substrate adhesive, and the first elastomeric member or the second elastomeric member is molded and adhered to the piston spindle during a vulcanization process or bonded using a post-vulcanization process. In another aspect, the strut is threaded or slotted at a first end to the first strut spindle and threaded or slotted at a second end to the second strut spindle. In another aspect, the one or more removable struts further comprise one or more surfaces on at least a portion of the strut to be engaged by a wrench.

In another embodiment, a rotorcraft includes a fuselage; one or more engines; and a vibration isolation device coupled to the fuselage, the vibration isolation device including a piston spindle; a first elastomeric member bonded to the piston spindle; a second elastomeric member bonded to the piston spindle; an upper housing in contact with the first elastomeric member; a lower housing in contact with the second elastomeric member; a first strut support attached to or integral with the upper housing; a second strut support attached to or integral with the lower housing; a first strut spindle configured to be placed in the first strut support; a second strut spindle configured to be placed in the second strut support; and one or more struts engaged at a first end to the first strut spindle and engaged at a second end to the second strut spindle, without engagement of the first end to the first strut support or engagement of the second end to the second strut support, wherein at least one of the first or second strut spindles is removable such that the one or more struts can be replaced without breaking a bonding of the first elastomeric member, the second elastomeric member, or both. In one aspect, the first elastomeric member or the second elastomeric member comprises rubber, plastics, composites, or layered materials. In another aspect, the first elastomeric member is bonded to the piston spindle or the second elastomeric member is bonded to the piston spindle using an elastomer-to-substrate adhesive, and the first elastomeric member or the second elastomeric member is molded and adhered to the piston spindle during a vulcanization process or bonded using a post-vulcanization process. In another aspect, the strut is threaded or slotted at a first end to the first strut spindle and threaded or slotted at a second end to the second strut spindle. In another aspect, the one or more removable struts further comprise one or more surfaces on at least a portion of the strut to be engaged by a wrench.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
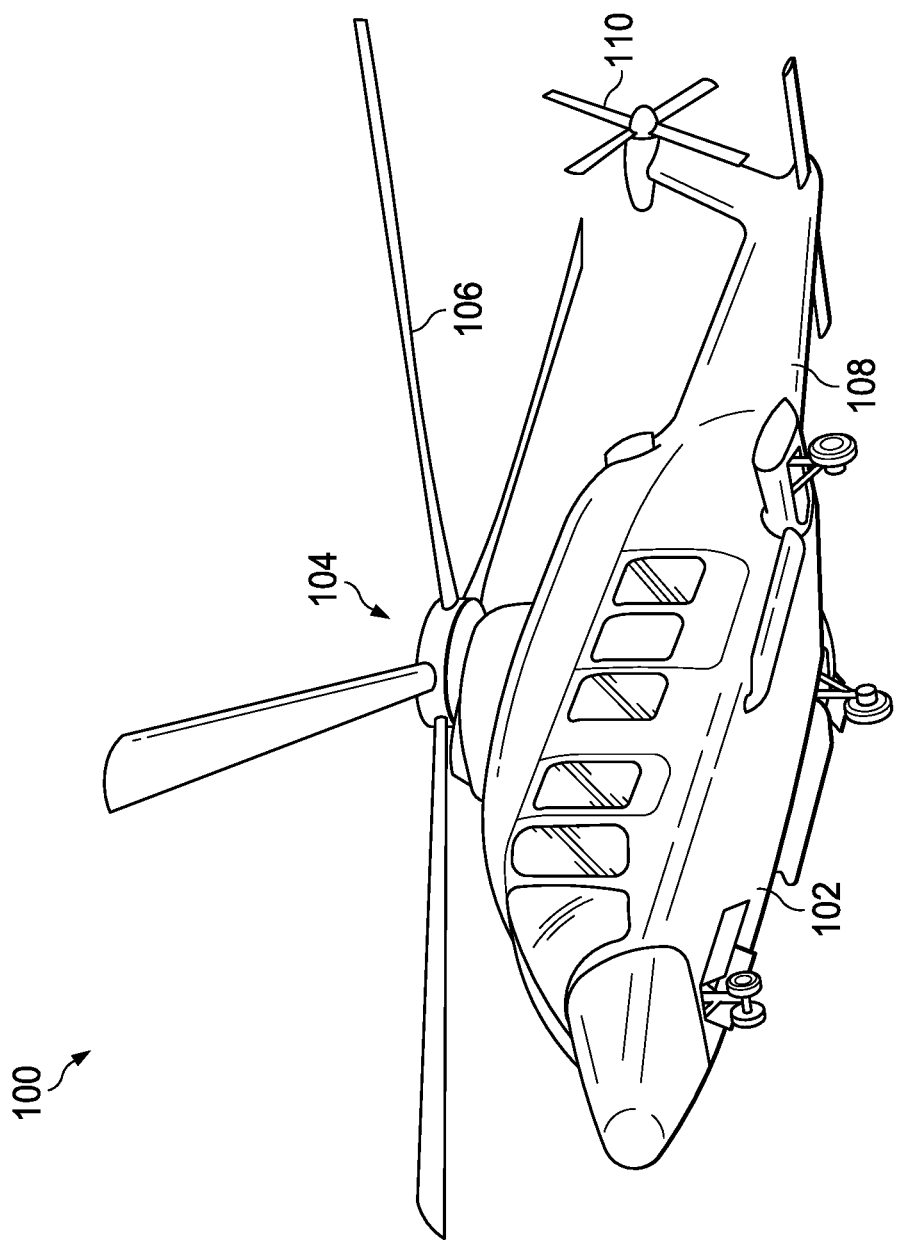
FIG. 1 shows an isometric view of a helicopter according to a preferred embodiment of the present application.

Now referring to FIG. 1, an aircraft 100 in accordance with a preferred embodiment of the present application is shown. In the exemplary embodiment, aircraft 100 is a helicopter having a fuselage 102 and a rotor system 104 carried thereon. A plurality of rotor blades 106 is operably associated with rotor system 104 for creating flight. A tail boom 108 is depicted that further includes tail rotor 110. The system of the present invention can be used in conjunction with an aircraft 100. Although shown associated with a helicopter, it will be appreciated that the mounting system of the present application can also be utilized with different types of aircraft and vehicles.

The present invention will now be described in reference to one example of a vibration isolation device. It will be appreciated that the mounting system of the present application can be used with other vibration isolation devices, including but not limited to, those described above in the background. Some external changes to the housings may be required.

Figure 2A:
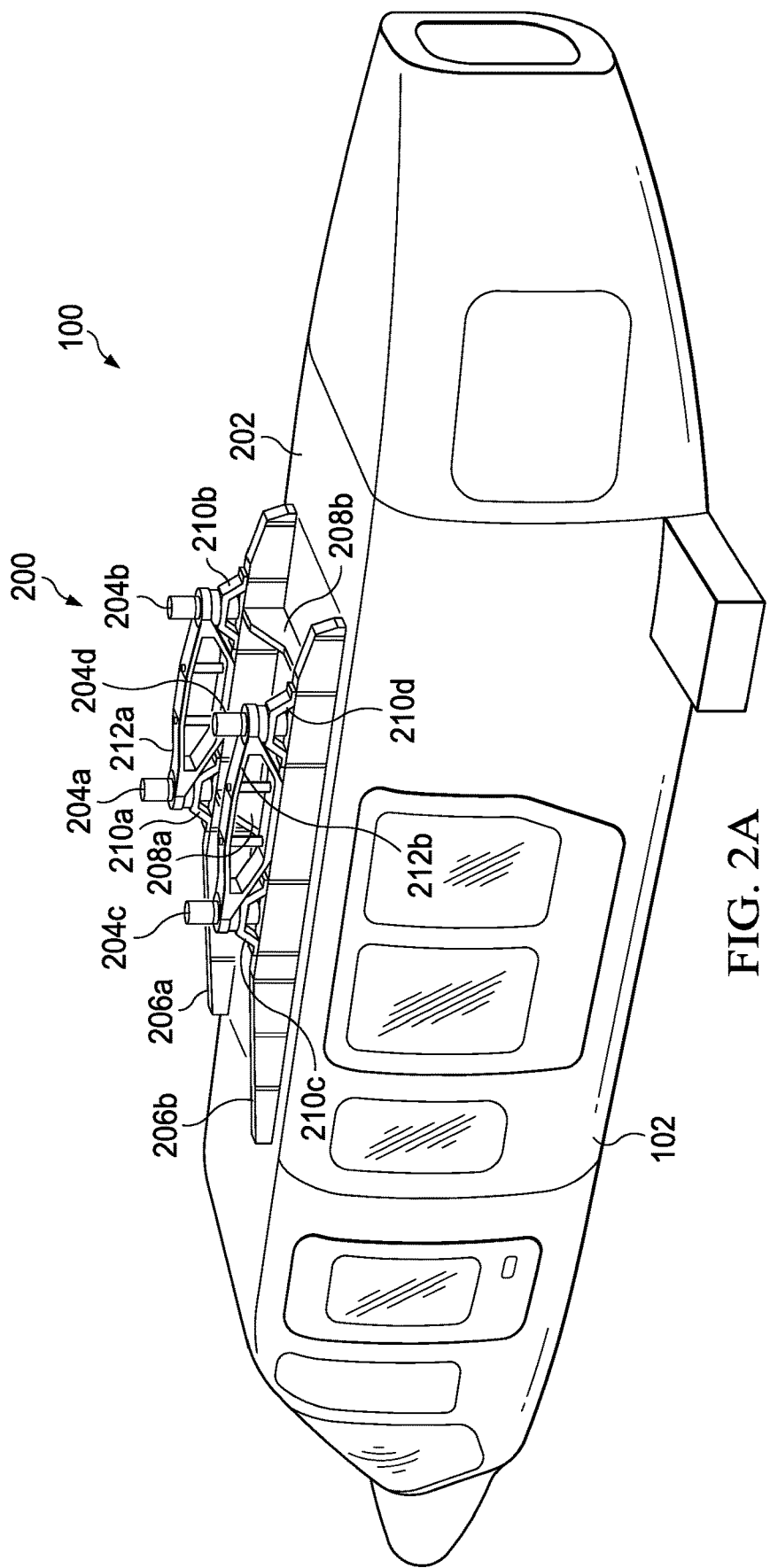
FIGS. 2A and 2B show different views of a vibration suppression system for a helicopter according to an embodiment of the present application.
Figure 2B:
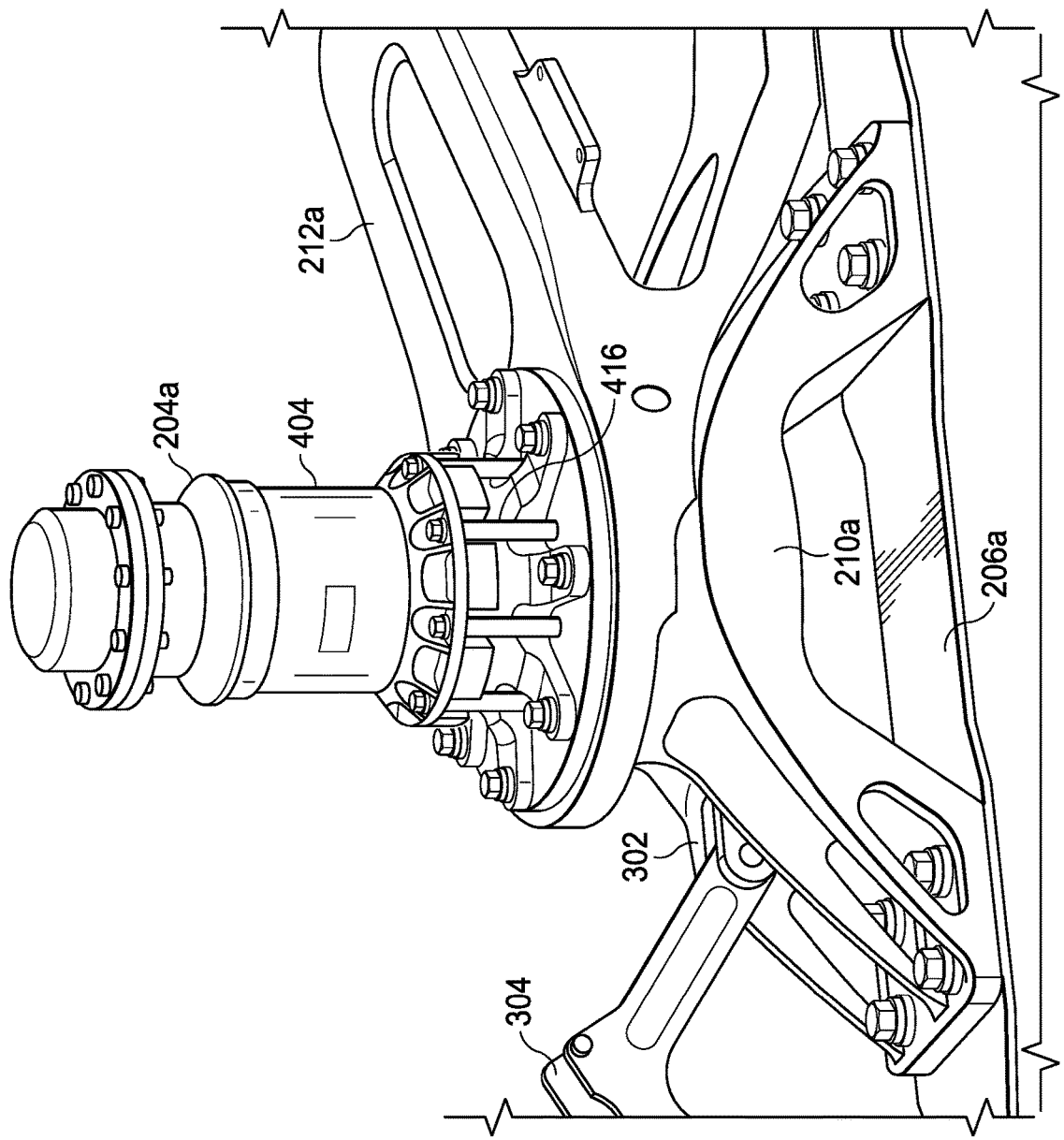

Referring now to FIGS. 2A and 2B, a vibration suppression system 200 for aircraft 100 in accordance with one embodiment is shown along with a partial view of fuselage 102 with an exposed roof 202. The vibration suppression system 200 includes a vibration isolation device 204, also referred to as a vibration isolation device or vibration eliminator, located in each corner in a four-corner pylon mount structural assembly. The combination of four vibration isolation devices 204a-204d, two being forward of transmission or main rotor gearbox (MRGB) (not shown), and two being aft of the MRGB, collectively are effective at isolating main rotor vertical shear, pitch moment, as well as roll moment induced vibrations. For example, rotor hub induced pitch moment vibrations, which can become relatively large in high-speed forward flight, can be effectively isolated with the four vibration isolation devices 204a-204d in the corner arrangement.

The vibration suppression system 200 includes a first roof beam 206a, a second roof beam 206b, a forward cross member 208a, and an aft cross member 208b coupled to the airframe. Structural adapters can be used to structurally couple first roof beam 206a and second roof beam 206b with cross members 208a and 208b. Support structures (hereinafter referred to as first bipod mount 210a and second bipod mount 210b) are coupled to the first roof beam 206a, and bipod mounts 210c and 210d are coupled to the second roof beam 206b. First vibration isolation device 204a is coupled to the first bipod mount 210a using the mounting system described herein. Likewise, second vibration isolation device 204b is coupled to the second bipod mount 210b, third vibration isolation device 204c is coupled to the third bipod mount 210c, and fourth vibration isolation device 204d is coupled to the fourth bipod mount 210d, all using the mounting system described herein. First pylon structure 212a affixed to the MRGB is coupled to and extends between first vibration isolation device 204a and second vibration isolation device 204b. Similarly, second pylon structure 212b affixed to the MRGB is coupled to and extends between third vibration isolation device 204c and fourth vibration isolation device 204d. Each vibration isolation device 204a-204d is mounted substantially vertical. It should be appreciated that embodiments of vibration suppression system 200 may employ any practical number of engines and transmissions. Furthermore, it is contemplated that any plurality of pylon structures and vibration isolation devices may be used in a variety of orientations spaced fore, aft, and even inboard of the MRGB.

Pylon structures 212a, 212b are configured to correlate motion of the MRGB between a plurality of isolation devices 204a-204d simultaneously by suspending a portion of MRGB between the plurality of vibration isolation devices 204a-204d located on opposing ends of the pylon structures 212a-212b. The use of pylon structures 212a, 212b permits an aircraft to space the location of vibration isolation devices 204a-204d to an infinite number of locations independent of transmission or main rotor gearbox. Locating vibration isolation devices 204a-204d forward and aft of MRGB minimizes the size of each vibration isolation device 204a-204d and avoids the use of additional elements to control the dynamics of the MRGB. For example, the vibration suppression system 200 is springless in that the system 200 does not use a separate spring mounted externally beneath the MRGB to control dynamics of the MRGB. The vibration suppression system 200 is configured to control pitch and roll dynamics by spacing of vibration isolation devices 204a-204d and the use of pylon structures 212a and 212b. Bipod mounts 210a-210d include a clevis 302 that is used to mount the engine (not shown) via member 304.

Further, implementing active vibration isolation devices, such as piezoelectric vibration isolation devices, can be effective for vibration isolation for a multiple RPM rotorcraft. It should be appreciated that other active actuation methods can be used as well, such as hydraulic, electromagnetic, electromechanical, magnetohydrodynamic, to name a few. Active vibration isolation devices can also achieve better vibration isolation by overcoming damping losses, and adjusting the frequency response characteristics. Further, each opposing pair of vibration isolation devices 204a-204d can efficiently react against the moment oscillations because the moment can be decomposed into two antagonistic vertical oscillations at each vibration isolation device 204.

Each vibration isolation device 204a-204d includes an upper housing 404 and a lower housing 406 (not shown). A plurality of support struts 416 connects the upper housing 404 and the lower housing 406. It is desirable to integrate the struts 416 into a vibration isolation device such that the struts can be removed and installed without damage to the vibration isolation devices 204a-204d. The present invention addresses this desirable feature.

Figure 3:
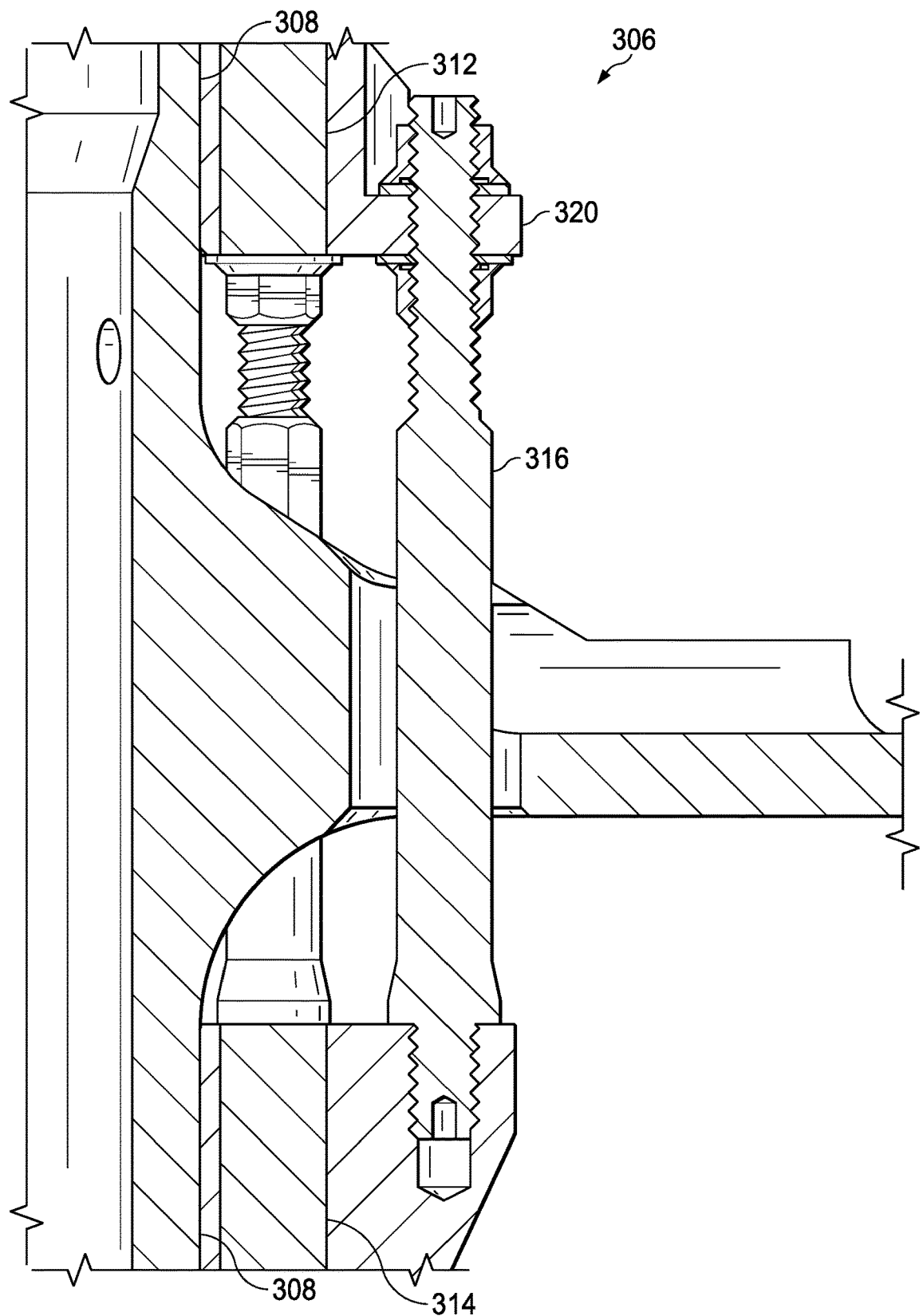
FIG. 3 shows a prior art vibration isolation device mounted in a support structure according.

FIG. 3 shows a typical installation of the prior art. In such a prior art installation, integral threads ran through first strut support 320, and strut 316 was held in place in first strut support 320 by being screwed onto it. To remove strut 316, a load was applied to displace either elastomeric member 312 or elastomeric member 314, breaking the bond line between either elastomeric member 312 and piston spindle 308, or between elastomeric member 314 and piston spindle 308. Further, the prior art vibration isolation device 306 had to be placed in a fixture to apply a load that displaces either elastomeric member 312 or elastomeric member 314, enough to allow removal of the strut 316, thus requiring a breaking of the bonding with the piston spindle 308.

Figure 4A:
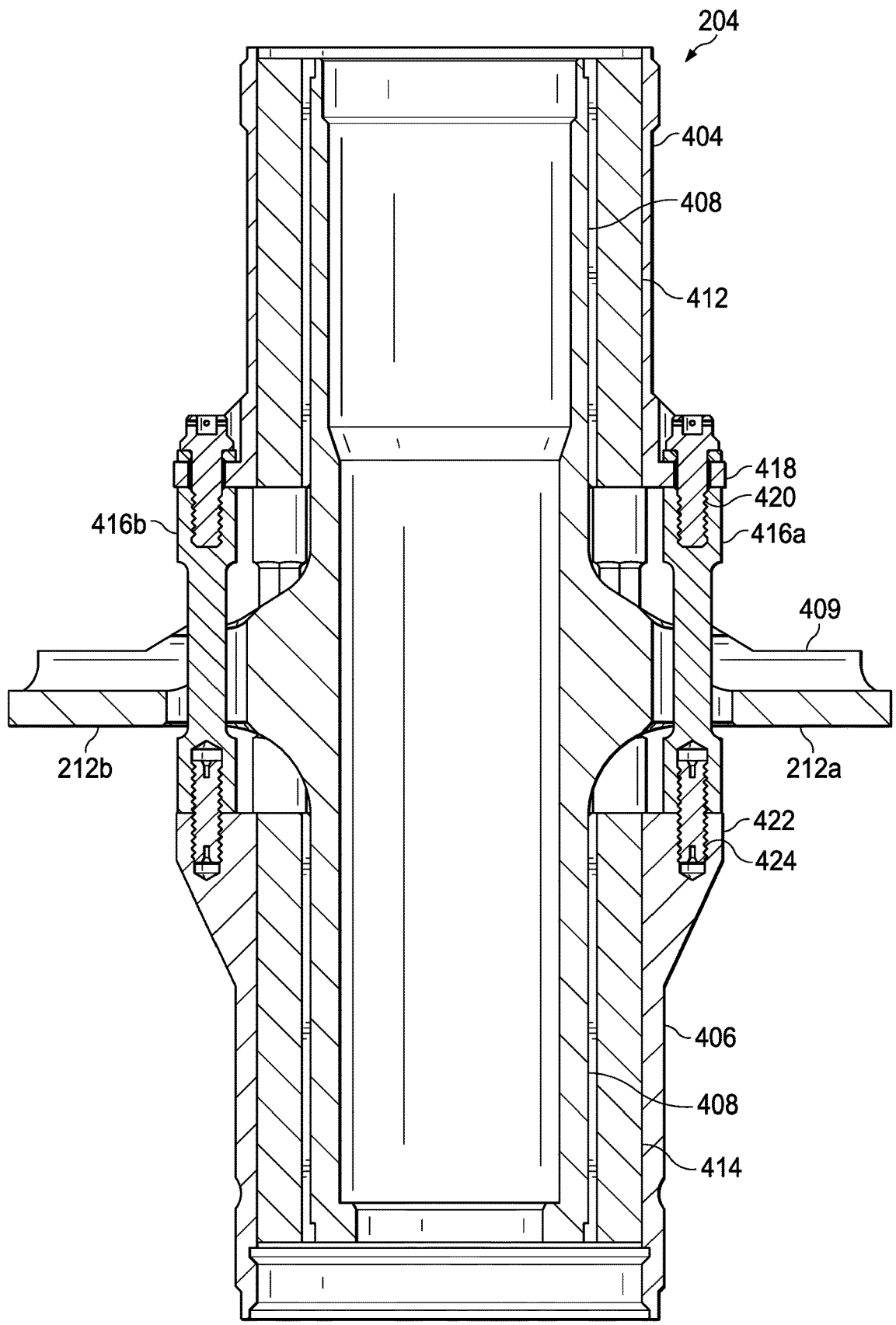
FIG. 4A shows a cross-sectional view of a vibration isolation device and mounting system in accordance with one embodiment of the present invention.

FIG. 4A shows a cross-sectional view of a vibration isolation device 204, including the upper housing 404 and the lower housing 406. In one non-limiting example, the vibration isolation device 204 can be a liquid inertia vibration eliminator (LIVE) system. A piston spindle 408 (also referred to as "spindle 408" herein) is at least partially disposed within the interior of upper housing 404 and lower housing 406. Flange 409 of piston spindle 408 couples to the pylon structure 212a or 212b, which is the vibrating structure. An upper elastomeric member 412 seals and resiliently contains the piston spindle 408 within the interior of upper housing 404. Similarly, a lower elastomeric member 414 seals and resiliently locates the piston spindle 408 within the interior of lower housing 406. Elastomeric members 412 and 414 function at least as a spring to permit the piston spindle 408 to move or oscillate relative to the upper housing 404 and the lower housing 406. When no load is applied, elastomeric members 412 and 414 are configured to locate the piston spindle 408 generally central to upper housing 404 and lower housing 406. Elastomeric members 412 and 414 may include rubber, plastics, composites, layered materials or any other durable material capable of withstanding heavy vibration and capable of being bonded to the material of the upper housing 404 and the lower housing 406. Elastomeric bearings 412 and 414 may be bonded to spindle 408 with, e.g. a two-part room-temperature-curing epoxy adhesive or an elastomer-to-substrate adhesive such as a CHEIVILOK® adhesive, and molded and adhered to the piston spindle 408 during a vulcanization process or bonded using a post-vulcanization process.

Upper housing 404 and lower housing 406 are coupled via support struts 416a, 416b. Shown herein are two struts, strut 416a and strut 416b, however, vibration isolation device 204 may have two or more struts 416. One skilled in the art will recognize that vibration isolation device 204 may have 2, 3, 4, 5, 6, 7, 8 or more struts 416a, 416b. First strut support 418 and first removable strut spindle 420 hold each strut 416a, 416b in place at upper housing 404, and second strut support 422 and second strut spindle 424 hold each strut 416 in place at lower housing 406. When installed, strut 416a, 416b is threaded to first strut spindle 420 and second strut spindle 424, without engagement (e.g., threaded or slotted engagement) of the first end to the first strut support or engagement (e.g., threaded or slotted engagement) of the second end to the second strut support. Such threated attachments and similar threaded attachments described herein may be sealed with a sealant, e.g., the anaerobic sealant LOCTITE®.

The present invention finds a particular advantage when a strut 416 is damaged and needs to be replaced. The present invention permits removal of strut 412 without breaking the bond line between elastomeric member 412 and upper housing 404 or the bond line between elastomeric member 414 and lower housing 406. In this embodiment, the first removable spindle 420 (which can be, e.g., a bolt, spindle, peg, etc.), is removed or unscrewed and the strut 416 is displaced in a lateral direction and removed or unscrewed from the second strut spindle 424. In a typical installation, the strut 416 is provided with a shape that permits for the use of a wrench to unscrew the strut 416 from the second strut spindle 424 without the need to break the bond line between the elastomeric bearings 412 and 414 and piston spindle 408 or the need to place the assembly in a fixture and applying load to displace the bearing. Thus, each of the struts 416 can be replaced individually. The skilled artisan will recognize that the first strut spindle 420 and second strut spindle 424 can be threaded, slotted, or otherwise engaged in a manner that provides mechanical attachment between the upper housing 404 and the lower housing 406. Furthermore, in certain embodiments the strut 416 has a shape or finish that in at least a portion of the longitudinal portion of the strut allows for the use of a wrench or other device to rotate the strut 416. In one non-limiting example, the shaft portion of the strut 416 may have one or more surfaces that form a polygonal shape or cross-section, e.g., square, rectangular, hexagonal, etc. In this embodiment, the first removable spindle 420 is disengaged, e.g., unscrewed, from the strut 416 at the upper housing 404, which then allows for the strut 416 to be disengaged, e.g., unscrewed, from the second strut spindle 424, and the upper portion the strut 416 is laterally displaced for removal. Removal may be accomplished using a wrench that engages the hexagonal shape of the longitudinal portion of the strut 416 to disengage, e.g., unscrew, the strut 416 from the second strut spindle 424. When a replacement strut 416 is reinstalled, it may be necessary to provide a new second strut spindle 424. The first removable spindle 420 may be reused or replaced, depending on its condition.

Figure 4B:
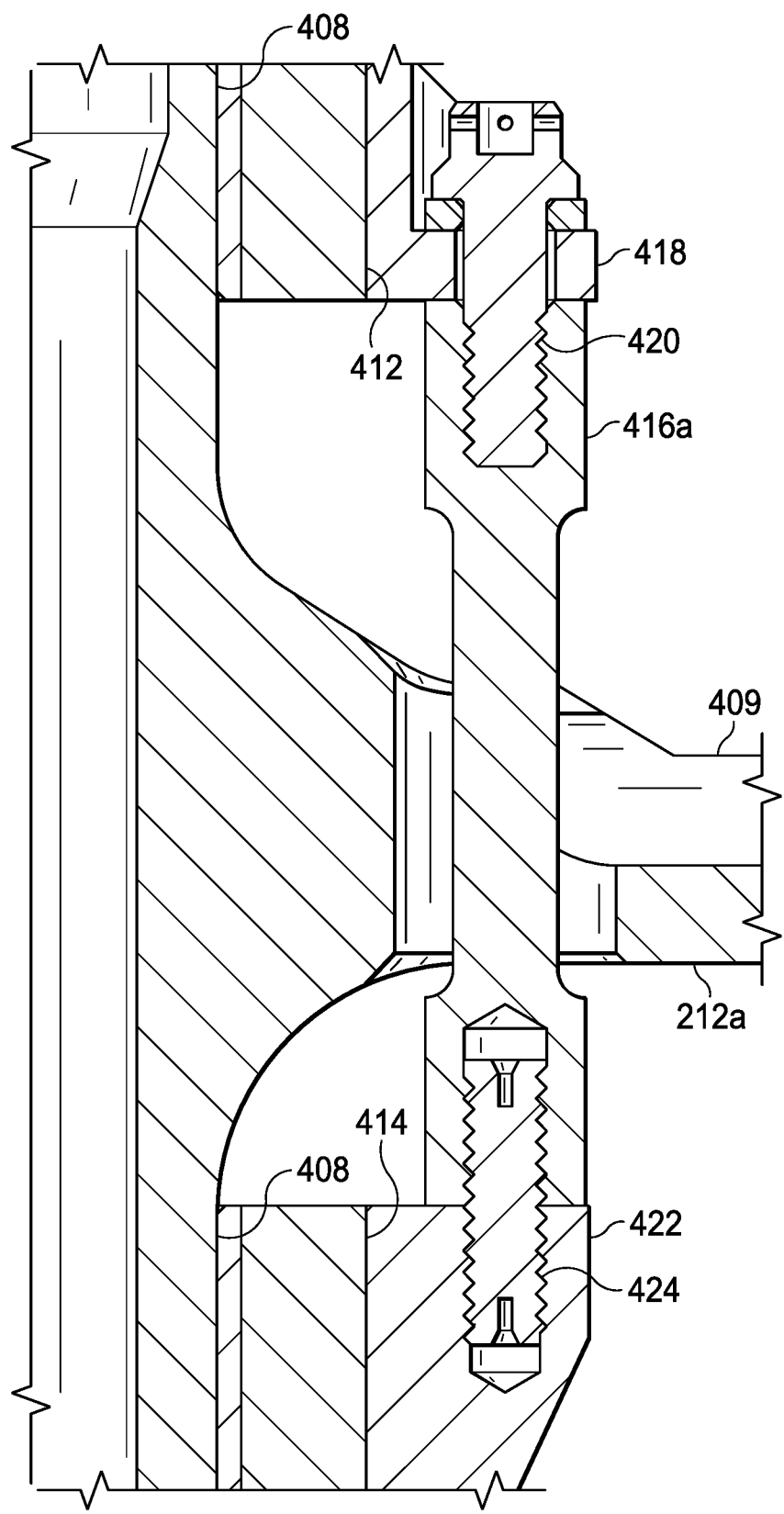
FIG. 4B shows a detailed view of the mounting system illustrated in FIG. 4A.

FIG. 4B depicts a detailed view the embodiment of the present invention shown in FIG. 4A. In this view, the strut 416a, first strut spindle 420, and second strut spindle 424 are shown in place with piston spindle 408, flange 409, pylon structure 212, first strut support 418, and second strut support 422. Also shown are first and second elastomeric members 412 and 414.

Figure 4C:
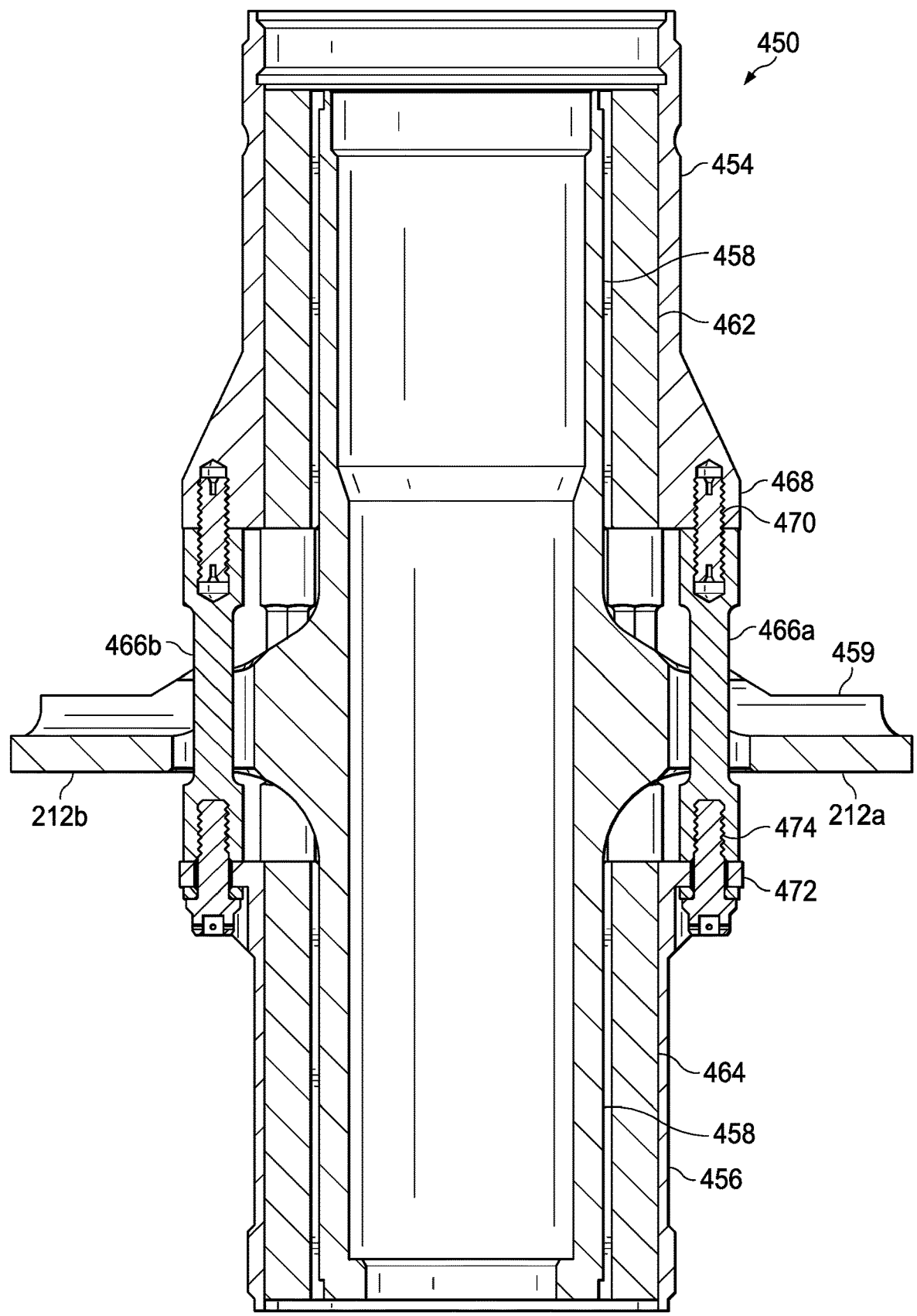
FIG. 4C shows a cross-sectional view of another vibration isolation device and mounting system in accordance with another embodiment of the present invention.

FIG. 4C depicts a cross-sectional view of the vibration isolation device 450, which is similar to vibration isolation device 204 except that the removable spindle 474 is found facing downward, which may find particular benefits. This embodiment of the invention works similarly to the embodiment illustrated in FIG. 4A. Vibration isolation device 450 includes first housing 454 (corresponding to the lower housing 404), second housing 456 (corresponding to the upper housing 404), first elastomeric member 462, second elastomeric member 464, struts 466a and 466b, first strut support 468, first strut spindle 470, second strut support 472, and second strut spindle 474. Also shown is flange 459 of piston spindle 458. In this embodiment, the second removable spindle 474 (bolt, spindle, peg, etc.) can be removed or disengaged, e.g., unscrewed. After removing the second removable spindle 474 the strut 416 is displaced in a lateral direction and removed or disengaged, e.g., unscrewed from the first strut spindle 470. In a typical installation, the strut 416 is provided with a shape that permits the use of a wrench to disengage, e.g., unscrew the strut 416 from the first strut spindle 470 without the need to break the bond line between the elastomeric members 462 and 464 and spindle 458. Thus, each of the struts 416 can be replaced individually. The skilled artisan will recognize that the first strut spindle 470 and second strut spindle 474 can be threaded, slotted, or otherwise engaged in a manner that provides mechanical attachment between the upper housing 404 and the lower housing 406. In one non-limiting example, the shaft portion of the strut 416 may have a polygonal shape or cross-section, e.g., square, rectangular, hexagonal, etc. Furthermore, the skilled artisan will recognize that in certain embodiments both the first strut spindle 470 and second strut spindle 474 may be removable.

Figure 5:
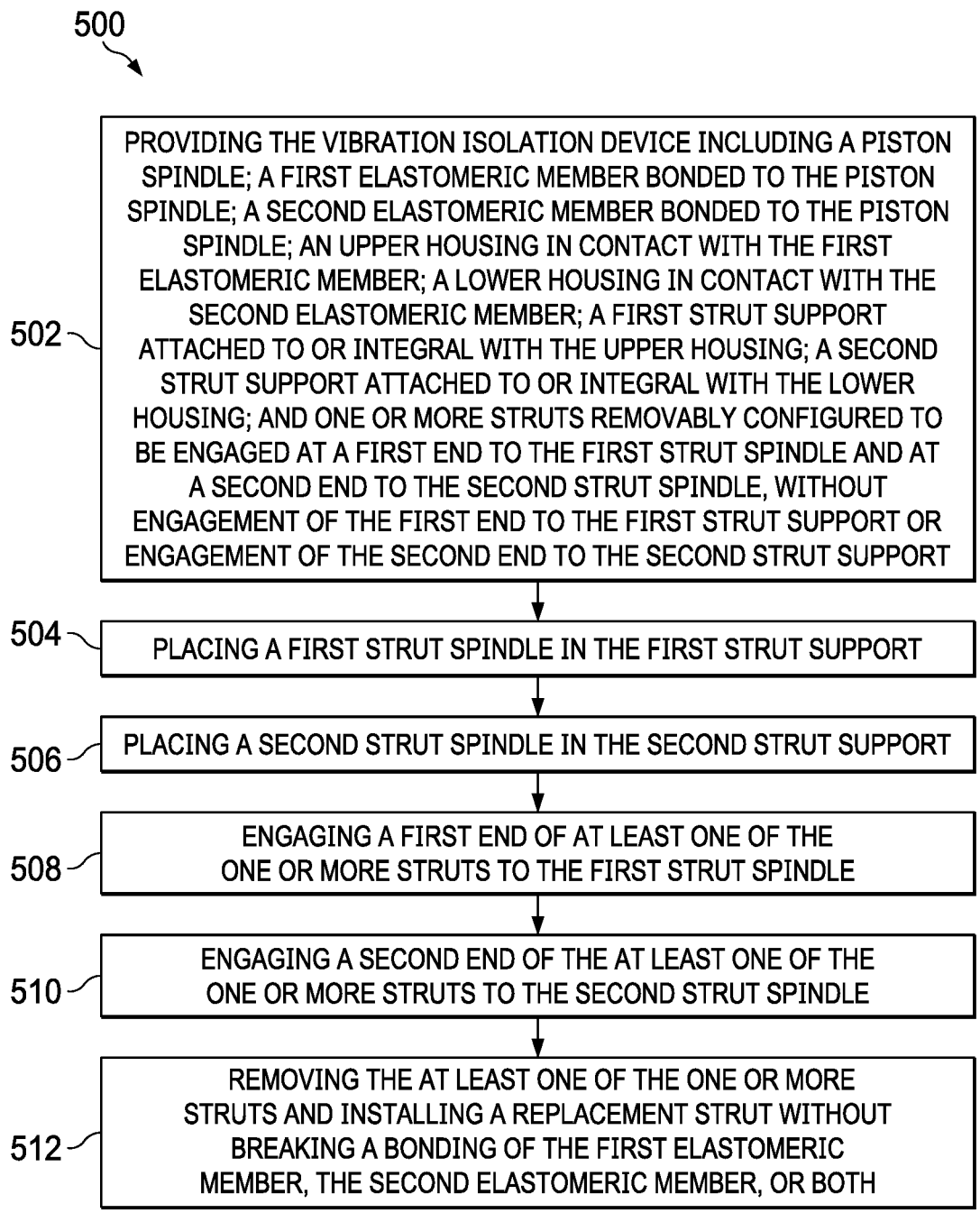
FIG. 5 shows a flowchart of a method for integrating a strut into a vibration isolation device in accordance with another embodiment of the present invention.

FIG. 5 illustrates a method embodiment of the present invention. Method 500 of replacing a strut of a vibration isolation device includes block 502, providing the vibration isolation device including a piston spindle; a first elastomeric member bonded to the piston spindle; a second elastomeric member bonded to the piston spindle; an upper housing in contact with the first elastomeric member; a lower housing in contact the second elastomeric member; a first strut support attached to or integral with the upper housing; a second strut support attached to or integral with the lower housing; and one or more struts removably configured to be engaged at a first end to the first strut spindle and at a second end to the second strut spindle, without engagement of the first end to the first strut support or engagement of the second end to the second strut support. Method 500 continues with block 504, in which a first strut spindle is placed in the first strut support. Method 500 also includes block 506, placing a second strut spindle in the second strut support. Block 508 of method 500 includes engaging a first end of at least one of the one or more struts to the first strut spindle, and in block 510, a second end of the at least one of the one or more struts is engaged to the second strut spindle; and in block 512, removing the at least one of the one or more struts and installing a replacement strut without breaking a bonding of the first elastomeric member, the second elastomeric member, or both.

Figure 6:
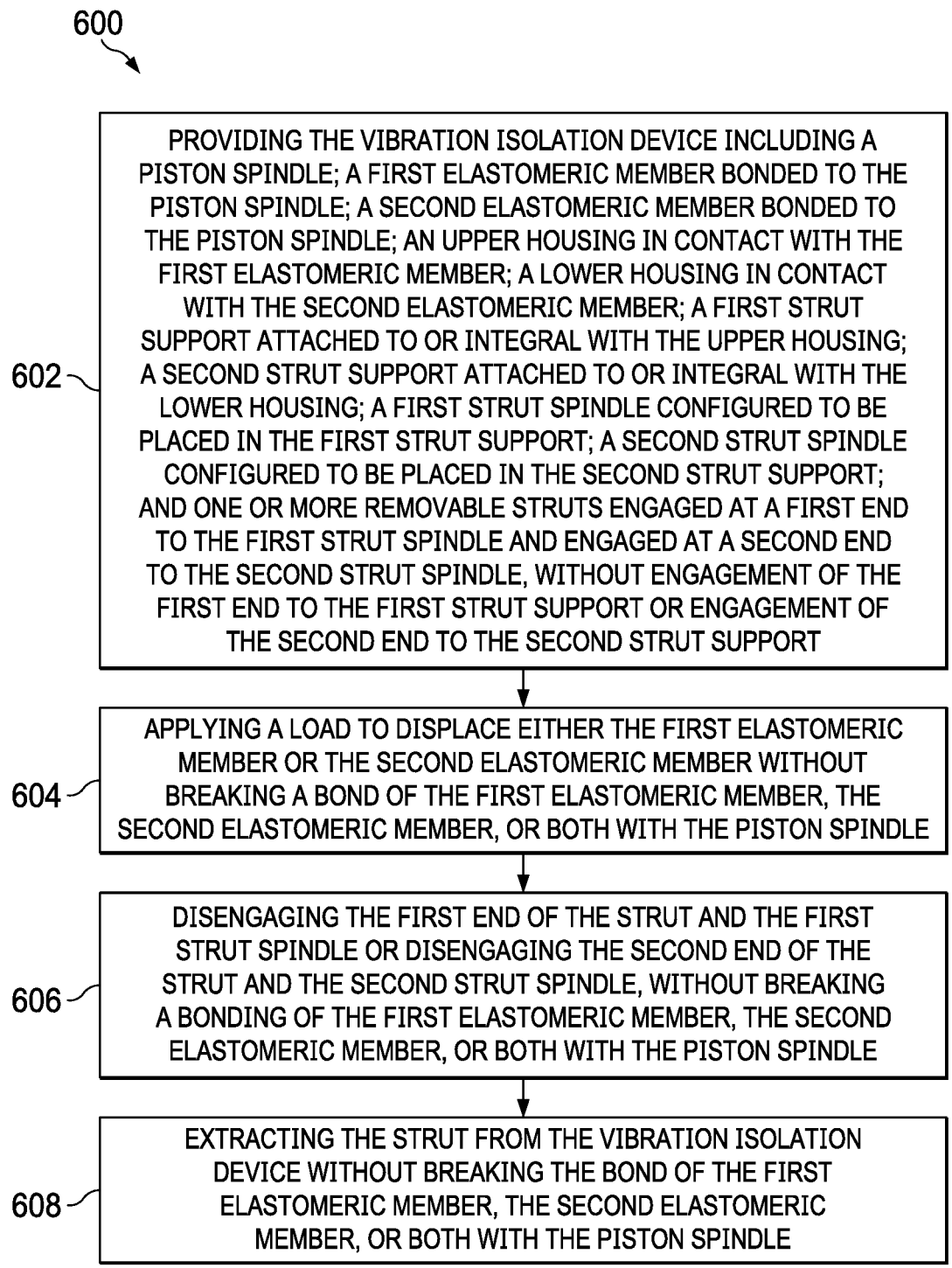
FIG. 6 shows a flowchart of a method for removing a strut from a vibration isolation device.

FIG. 6 depicts another method embodiment of the present invention. Method 600 for removing a strut from a vibration isolation device includes block 602, providing the vibration isolation device including a piston spindle; a first elastomeric member bonded to the piston spindle; a second elastomeric member bonded to the piston spindle; an upper housing in contact with the first elastomeric member; a lower housing in contact with the second elastomeric member; a first strut support attached to or integral with the upper housing; a second strut support attached to or integral with the lower housing; a first strut spindle configured to be placed in the first strut support; a second strut spindle configured to be placed in the second strut support; and one or more removable struts engaged at a first end to the first strut spindle and engaged at a second end to the second strut spindle, without engagement of the first end to the first strut support or engagement of the second end to the second strut support. In block 604, a load is applied to displace either the first elastomeric member or the second elastomeric member without breaking a bond of the first elastomeric member, the second elastomeric member, or both with the piston spindle. In block 606, the first end of the strut and the first strut spindle are disengaged or the second end of the strut and the second strut spindle are disengaged, without breaking a bond of the first elastomeric member, the second elastomeric member, or both with the piston spindle. In block 608 of method 600, the strut is extracted from the vibration isolation device, again, without breaking a bond of the first elastomeric member, the second elastomeric member, or both with the piston spindle.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the fastener subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process step(s), or limitation(s)) only.

As used herein, the term "or combinations thereof" refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial," or "substantially," refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A strut assembly for a vibration isolation device comprising:
   a first strut spindle configured to be placed in a first strut support of the vibration isolation device;
   a second strut spindle configured to be placed in a second strut support of the vibration isolation device; and
   one or more removable struts configured to be engaged at a first end to the first strut spindle without engagement of the first end to the first strut support and at a second end to the second strut spindle without engagement of the second end to the second strut support.

2. The assembly of claim 1, wherein the one or more removable struts is configured to be threaded or slotted at a first end to the first strut spindle and configured to be threaded or slotted at a second end to the second strut spindle.

3. The assembly of claim 1, wherein the one or more removable struts further comprise one or more surfaces on at least a portion of the strut to be engaged by a wrench.

4. The assembly of claim 1, wherein the vibration isolation device further comprises:
   a piston spindle;
   a first elastomeric member bonded to the piston spindle;
   a second elastomeric member bonded to the piston spindle;
   an upper housing in contact with the first elastomeric member;
   a lower housing in contact with the second elastomeric member;
   the first strut support attached to, or integral with, the upper housing; and
   the second strut support attached to, or integral with, the lower housing.

5. The assembly of claim 4, wherein at least one of the first or second strut spindles is removable such that the one or more struts can be replaced without breaking a bonding of the first elastomeric member, the second elastomeric member, or both.

6. The assembly of claim 4, wherein the first elastomeric member or the second elastomeric member comprises rubber, plastics, composites, or layered materials.

7. A method of replacing a strut of a vibration isolation device, the method comprising:
   extracting the strut from the vibration isolation device;
   placing a first strut spindle in a first strut support of the vibration isolation device;
   engaging a first end of a new strut to the first strut spindle without engagement of the first end of the new strut to the first strut support; and
   placing a second strut spindle in a second strut support of the vibration isolation device and engaging a second end of the new strut without engagement of the second end of the new strut to the second strut support.

8. The method of claim 7, wherein the new strut is threaded or slotted at a first end to the first strut spindle and threaded or slotted at a second end to the second strut spindle.

9. The method of claim 7, further comprising engaging one or more surfaces on at least a portion of the strut with a wrench.

10. The method of claim 7, further comprising disengaging a first end of the strut and the first strut spindle or disengaging a second end of the strut and the second strut spindle.

11. The method of claim 7, further comprising providing the vibration isolation device, wherein the vibration isolation device comprises:
- a piston spindle;
- a first elastomeric member bonded to the piston spindle;
- a second elastomeric member bonded to the piston spindle;
- an upper housing in contact with the first elastomeric member;
- a lower housing in contact with the second elastomeric member;
- the first strut support attached to, or integral with, the upper housing; and
- the second strut support attached to, or integral with, the lower housing.

12. The method of claim 11, wherein the strut is replaced without breaking a bonding of the first elastomeric member, the second elastomeric member, or both.

13. The method of claim 11, wherein the first elastomeric member or the second elastomeric member comprises rubber, plastics, composites, or layered materials.

14. The method of claim 11, further comprising applying a load to displace either the first elastomeric member or the second elastomeric member without breaking a bond of the first elastomeric member, the second elastomeric member, or both with the piston spindle.

15. A rotorcraft comprising:
- a fuselage;
- one or more engines; and
- a vibration isolation device coupled to the fuselage:
- one or more strut assemblies, each strut assembly comprising:
  - a first strut spindle configured to be placed in a first strut support of the vibration isolation device,
  - a second strut spindle configured to be placed in a second strut support of the vibration isolation device, and
  - one or more removable struts configured to be engaged at a first end to the first strut spindle without engagement of the first end to the first strut support and at a second end to the second strut spindle without engagement of the second end to the second strut support.

16. The rotorcraft of claim 15, wherein the one or more removable struts is configured to be threaded or slotted at a first end to the first strut spindle and configured to be threaded or slotted at a second end to the second strut spindle.

17. The rotorcraft of claim 15, wherein the one or more removable struts further comprise one or more surfaces on at least a portion of the strut to be engaged by a wrench.

18. The rotorcraft of claim 15, wherein the vibration isolation device further comprises:
- a piston spindle;
- a first elastomeric member bonded to the piston spindle;
- a second elastomeric member bonded to the piston spindle;
- an upper housing in contact with the first elastomeric member;
- a lower housing in contact with the second elastomeric member;
- the first strut support attached to, or integral with, the upper housing; and
- the second strut support attached to, or integral with, the lower housing.

19. The rotorcraft of claim 18, wherein at least one of the first or second strut spindles is removable such that the one or more struts can be replaced without breaking a bonding of the first elastomeric member, the second elastomeric member, or both.

20. The rotorcraft of claim 18, wherein the first elastomeric member or the second elastomeric member comprises rubber, plastics, composites, or layered materials.

* * * * *